(12) United States Patent
Delia et al.

(10) Patent No.: US 8,397,538 B2
(45) Date of Patent: Mar. 19, 2013

(54) APPARATUS AND METHOD FOR DRAWING A RIBBON OF GLASS

(75) Inventors: Robert Delia, Horseheads, NY (US); Shawn R. Markham, Harrodsburg, KY (US)

(73) Assignee: Corning Incorporated, Corning, NY (US)

( * ) Notice: Subject to any disclaimer, the term of this patent is extended or adjusted under 35 U.S.C. 154(b) by 467 days.

(21) Appl. No.: 12/699,497

(22) Filed: Feb. 3, 2010

(65) Prior Publication Data

US 2010/0212360 A1 Aug. 26, 2010

Related U.S. Application Data

(60) Provisional application No. 61/155,740, filed on Feb. 26, 2009.

(51) Int. Cl.
*C03B 17/06* (2006.01)

(52) U.S. Cl. .................... 65/195; 65/90; 65/53

(58) Field of Classification Search .............. 65/195, 65/90

See application file for complete search history.

(56) References Cited

U.S. PATENT DOCUMENTS

| | | | |
|---|---|---|---|
| 1,772,448 A * | 8/1930 | Allen .............................. | 65/195 |
| 6,990,834 B2 * | 1/2006 | Pitbladdo ...................... | 65/29.21 |
| 7,155,935 B2 | 1/2007 | Pitbladdo ......................... | 65/53 |
| 2005/0160767 A1 * | 7/2005 | Novak .......................... | 65/29.17 |
| 2005/0268657 A1 * | 12/2005 | Adamowicz et al. .............. | 65/53 |
| 2005/0268659 A1 * | 12/2005 | Rhoads .............................. | 65/53 |
| 2007/0140311 A1 | 6/2007 | House et al. ................... | 374/100 |
| 2008/0282736 A1 | 11/2008 | Filippov et al. .................... | 65/90 |
| 2009/0107182 A1 * | 4/2009 | Anderson et al. ................. | 65/90 |
| 2009/0314032 A1 | 12/2009 | Tomamoto et al. .......... | 65/29.14 |
| 2010/0126226 A1 * | 5/2010 | Zhou et al. ...................... | 65/158 |

FOREIGN PATENT DOCUMENTS

| | | |
|---|---|---|
| EP | 2 077 254 | 7/2009 |
| EP | 2 077 255 | 7/2009 |
| JP | 10-053425 | 2/1998 |
| JP | 10-053426 | 2/1998 |
| JP | 10-291826 | 11/1998 |
| JP | 10-291827 | 11/1998 |
| JP | 2002-167226 | 6/2002 |
| WO | 2007/075359 | 7/2007 |

* cited by examiner

*Primary Examiner* — Matthew Daniels
*Assistant Examiner* — Erin Snelting
(74) *Attorney, Agent, or Firm* — Kevin M. Able

(57) ABSTRACT

Apparatus and method for balancing the mass flow rate of molten glass flowing over a forming body to form a glass ribbon. The apparatus comprises upper and lower transition members that surround the glass ribbon as the glass ribbon is drawn from the forming body. The upper and lower transition members are independently moveable, and separated by a gap less than 8 cm across. The narrow gap minimizes disruption to the thermal environment contained within the upper and lower transition members, and is positioned a sufficient distance above the setting zone of the ribbon to minimize any influence on the dimensional consistency of the ribbon.

12 Claims, 4 Drawing Sheets

APPARATUS AND METHOD FOR DRAWING A RIBBON OF GLASS

CLAIMING BENEFIT OF PRIOR FILED U.S. APPLICATION

This application claims the benefit of U.S. Provisional Application Ser. No. 61/155,740, filed on Feb. 26, 2009. The content of this document and the entire disclosure of publications, patents, and patent documents mentioned herein are incorporated by reference.

BACKGROUND OF THE INVENTION

1. Field of the Invention

The present invention relates to the drawing of molten glass into a glass sheet, and in particular, to controlling the mass flow rate of the molten glass as it flows over a forming body and is drawn through downstream appliances.

2. Technical Background

One method of producing high quality sheets of glass is by the fusion downdraw method. Molten glass is flowed over converging forming surfaces of a forming body, wherein the molten glass fuses at the line where the converging forming surfaces meet to produce a glass ribbon. Drawing equipment positioned downstream of the forming body pull the ribbon downward, and individual glass sheets are cut from the continuous ribbon.

Maintaining the dimensional stability of the glass ribbon involves an intricate relationship between the mass flow distribution of the molten glass flowing over the forming body, the temperature control of the molten glass and the ribbon

SUMMARY

In one embodiment, an apparatus for forming a sheet of glass is described including a forming body comprising a trough and converging forming surfaces that join at a root such that molten glass overflowing the trough forms multiple streams of molten glass that flow over the converging forming surfaces and combine at the root to form a glass ribbon, and wherein the forming body can be tilted relative to a horizontal plane. The apparatus further comprises an upper transition member coupled to the forming body defining a first interior space through which the glass ribbon descends, and wherein the upper transition member can be tilted and a lower transition member positioned below the upper transition member, the lower transition member defining a second interior space through which the glass ribbon descends. The upper transition member and the lower transition member are separated by a gap less than 8 cm and wherein the gap is positioned such that a viscosity of the glass ribbon adjacent to the gap is equal to or less than about $10^{7.3}$ poise, and preferably also greater than about $10^{5.7}$ poise. Preferably the gap between the upper and lower transition members is equal to or less than about 8 cm, and more preferably less than about 3 cm.

The forming body and the upper transition member may be tilted in unison, and may be rigidly coupled.

To prevent air from leaking into the interior spaces of the transition members and disrupting the thermal environment within the transition members, an insulating blanket disposed between the upper and lower transition members. A flexible sealing member or membrane may be coupled to the upper and lower transition members and covering the gap to further prevent air leakage through the gap and to help retain the insulating blanket in position.

In addition to movement of the upper transition member, the lower transition member may be vertically movable relative to the horizontal plane. However, the upper transition member and lower transition member are independently moveable from each other. Thus, tilting of the upper transition member and vertical translation of the lower transition member may be conducted independently from each other.

In another embodiment, a method of balancing the mass flow rate of molten glass flowing over the surfaces of a forming body is disclosed.

The forming body comprises a trough and converging forming surfaces that join at a root such that molten glass overflowing the trough forms multiple streams of molten glass that flow over the converging forming surfaces and combine at the root to form a glass ribbon.

The method is characterized by the steps of tilting the forming body relative to a horizontal plane in response to a change in a mass flow rate of the molten glass flowing over the converging forming surfaces, tilting an upper transition body relative to the horizontal plane, the upper transition member positioned below and coupled to the forming body.

The glass ribbon is drawn through a first interior space defined by the upper transition member and a second interior space defined by a lower transition member positioned below the upper transition member. The upper transition member and the lower transition member are separated by a gap less than 8 cm and wherein the gap is positioned such that a viscosity of the glass ribbon horizontally adjacent to the gap is equal to or less than about $10^{7.3}$ poise. For example, the gap may be positioned such that a viscosity of the glass ribbon horizontally adjacent to the gap is equal to or less than about $10^7$ poise, equal to or less than about $10^{6.5}$ poise, or equal to or less than about $10^6$ poise.

According to the present embodiment, the upper and lower transition members may be independently moveable, wherein the lower transition member may be translated vertically relative to the horizontal plane, but not tilted while drawing the glass ribbon. In some instances the gap may be made equal to or less than 3 cm. In another embodiment, the lower transition member can be tilted.

The invention will be understood more easily and other objects, characteristics, details and advantages thereof will become more clearly apparent in the course of the following explanatory description, which is given, without in any way implying a limitation, with reference to the attached Figures. It is intended that all such additional systems, methods features and advantages be included within this description, be within the scope of the present invention, and be protected by the accompanying claims.

DETAILED DESCRIPTION

Figure 1:
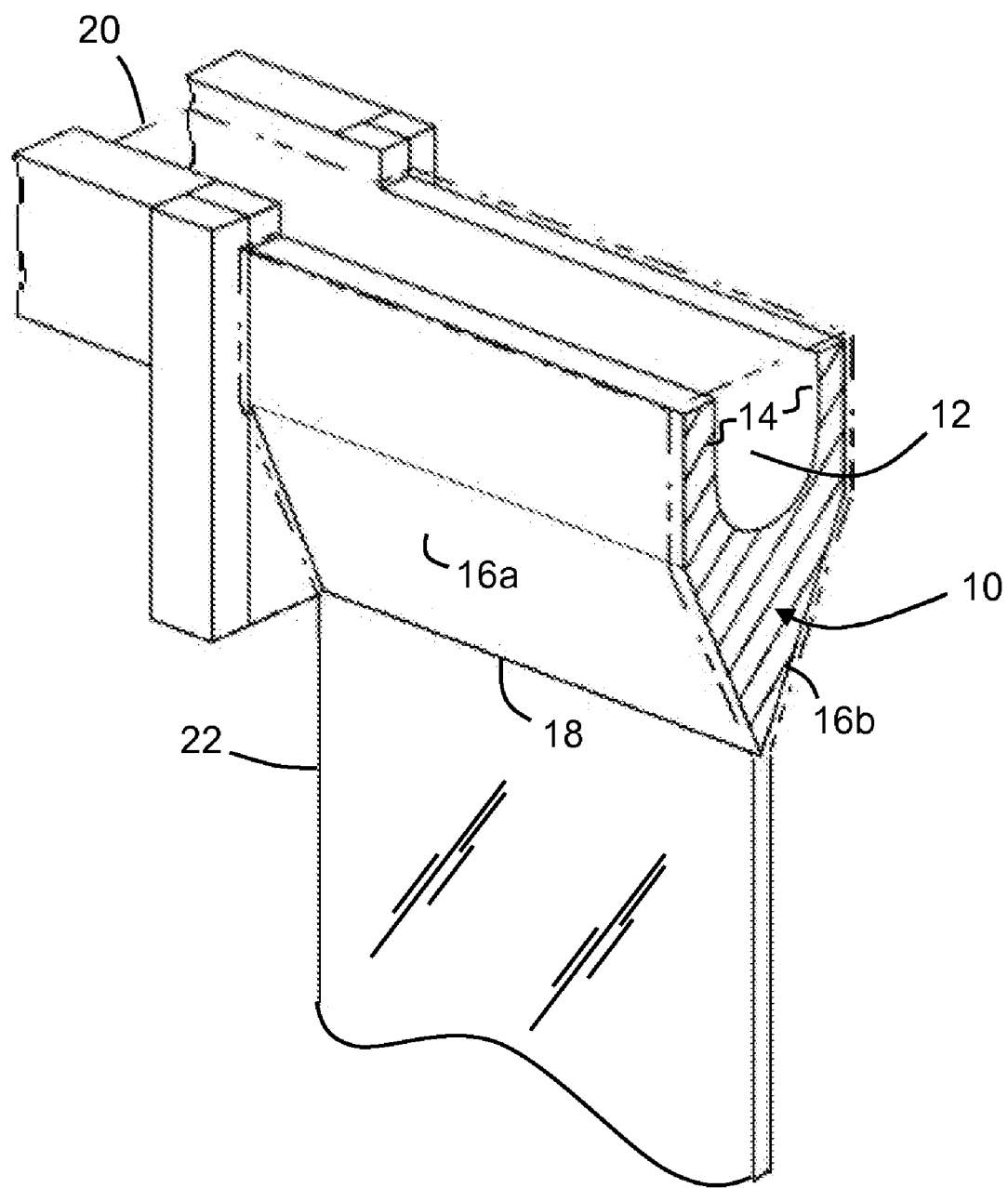
FIG. 1 is a perspective view and partial cross section of an exemplary forming body for use in a fusion downdraw glass sheet forming apparatus.

In the following detailed description, for purposes of explanation and not limitation, example embodiments disclosing specific details are set forth to provide a thorough understanding of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of the present invention. Finally, wherever applicable, like reference numerals refer to like elements.

As used here, unless otherwise defined, "above" and "below" are referenced in absolute terms to the surface of the earth. The terms may also relate relatively to objects in the same reference system. Thus, a first object one meter above the ground vertically beneath the object would be 1 meter above the ground surface, and an object 2 meters above the ground vertically over the first object would also be above the ground surface, but the first object would be below the second object.

One method of making glass sheet is by a fusion downdraw process, so called because a glass flow is caused to separate into two separate streams of molten glass that flow over a forming body. The streams are then rejoined, or fused, at the bottom of the forming body to produce the glass sheet. This can be more clearly understood with the benefit of FIG. 1 illustrating an exemplary forming body that may be used in a fusion downdraw glass making process.

FIG. 1 depicts forming body 10 comprising a channel or trough 12 formed in an upper portion of the body framed by side walls 14, and converging forming surfaces 16a and 16b that meet at root 18 extending along a length of the forming body. Molten glass 20 is introduced into trough 12 and overflows side walls 14 on both sides of the forming body, creating two separate streams of molten glass that flow down and over the forming body. The two separate molten glass streams flow over converging forming surfaces 16a and 16b, and meet at root 18, where root 18 is a line formed by the convergence of the converging forming surfaces. The streams rejoin, or fuse, at the root to produce a single stream that flows downward from the root as pristine glass ribbon 22. The molten glass that has been in contact with the surfaces of the forming body (e.g. the converging forming surfaces) is disposed within the interior portion of the resultant ribbon, whereas the outer surfaces of the ribbon have not contacted the forming surfaces.

Figure 2:
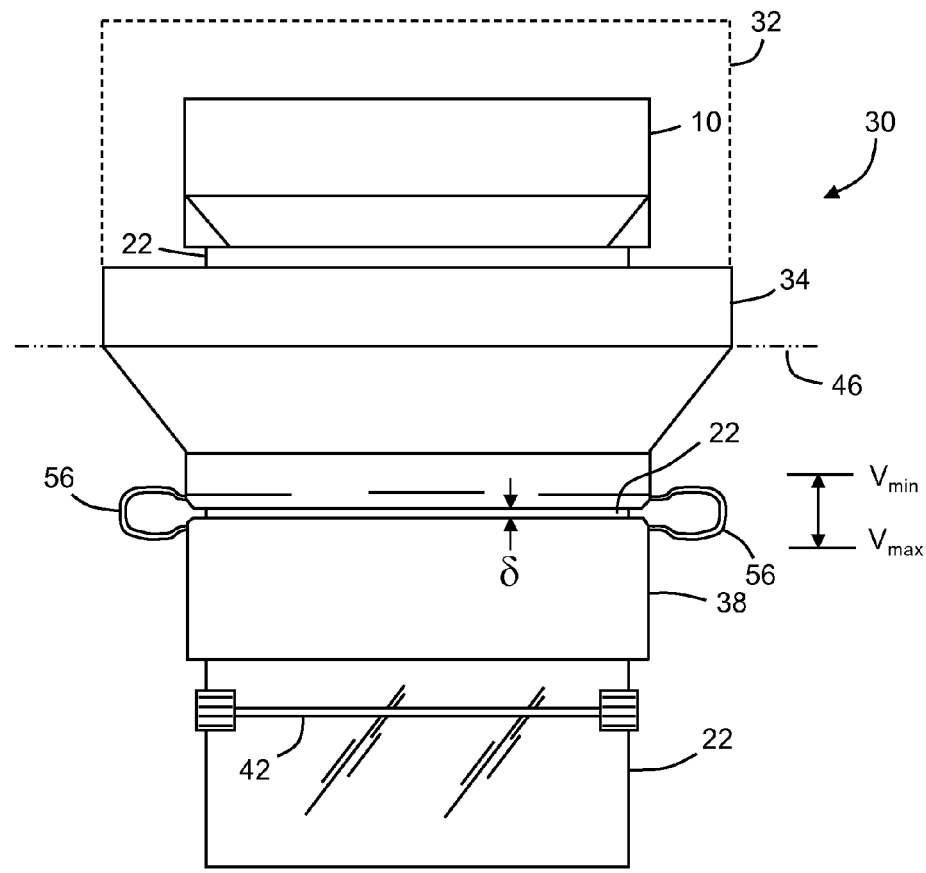
FIG. 2 is a side elevation view of a sheet forming apparatus according to an embodiment of the present invention.
Figure 3:
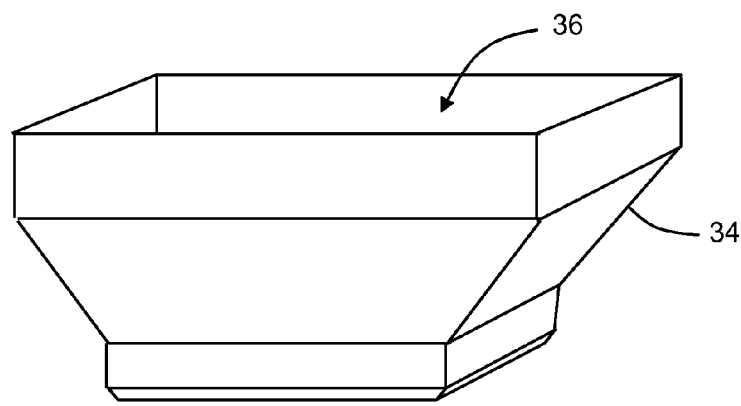
FIG. 3 is a perspective view of the upper transition member of the apparatus of FIG. 2.
Figure 4:
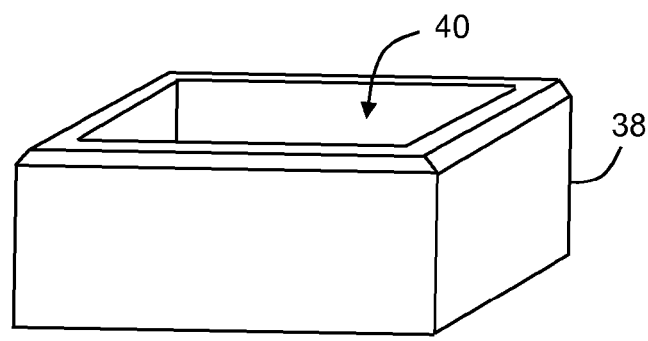
FIG. 4 is a perspective view of the lower transition member of the apparatus of FIG. 2

FIG. 2 illustrates fusion draw apparatus 30 comprising forming body 10 of FIG. 1. In addition to forming body 10, fusion draw apparatus 30 comprises muffle 32 enclosing forming body 10, upper transition member 34 defining first interior space 36 (FIG. 3), lower transition member 38 defining second interior space 40 (FIG. 4) and rollers for drawing the sheet downward represented by pulling roller set 42 (pulling roller set 42 constitutes two pair of the pulling roller sets shown on opposite sides of the ribbon, such that the ribbon is pinched between the opposing rollers). Muffle 32, upper transition member 34 and lower transition member 38, in combination with various heating and cooling appliances (not shown) disposed within the muffle and transition bodies, serve to regulate the thermal environment surrounding glass ribbon 22 as it is drawn from forming body root 18 and down through the upper and lower transition members. The ability to control the thermal environment of the ribbon, and particularly the thermal environment in the temperature range over which the glass ribbon cools and transitions from a viscoelastic material to an elastic material, allows the manufacture of thin sheets of glass of very high quality. The temperature range where 90% of the high temperature stresses will be retained at room temperature. It is calculated considering the effect of cooling rates and glass visco-elastic properties. That is, for higher cooling rates (e.g. draw velocities) the setting zone goes hotter and smaller.

According to the embodiment of FIG. 2, muffle 32, upper transition member 34 and forming body 10 are physically coupled so that the components can move as a unit. Moreover, muffle 32, upper transition member 34 and forming body 10 can be tilted relative to horizontal plane 46 to balance the mass flow rate of molten glass flowing over forming body 10 as a function of position along the length of the forming body. Tilting can be performed, for example, by supporting at least one end of the coupled muffle-forming body-transition member assembly via jack screws. For example, in response to a change or disruption in mass flow rate of molten glass over the forming body, the forming body can be tilted as needed to redistribute the molten glass flowing over the length of the forming body (from one end to the other end) to maintain a consistent thickness of glass ribbon 22.

Figure 5:
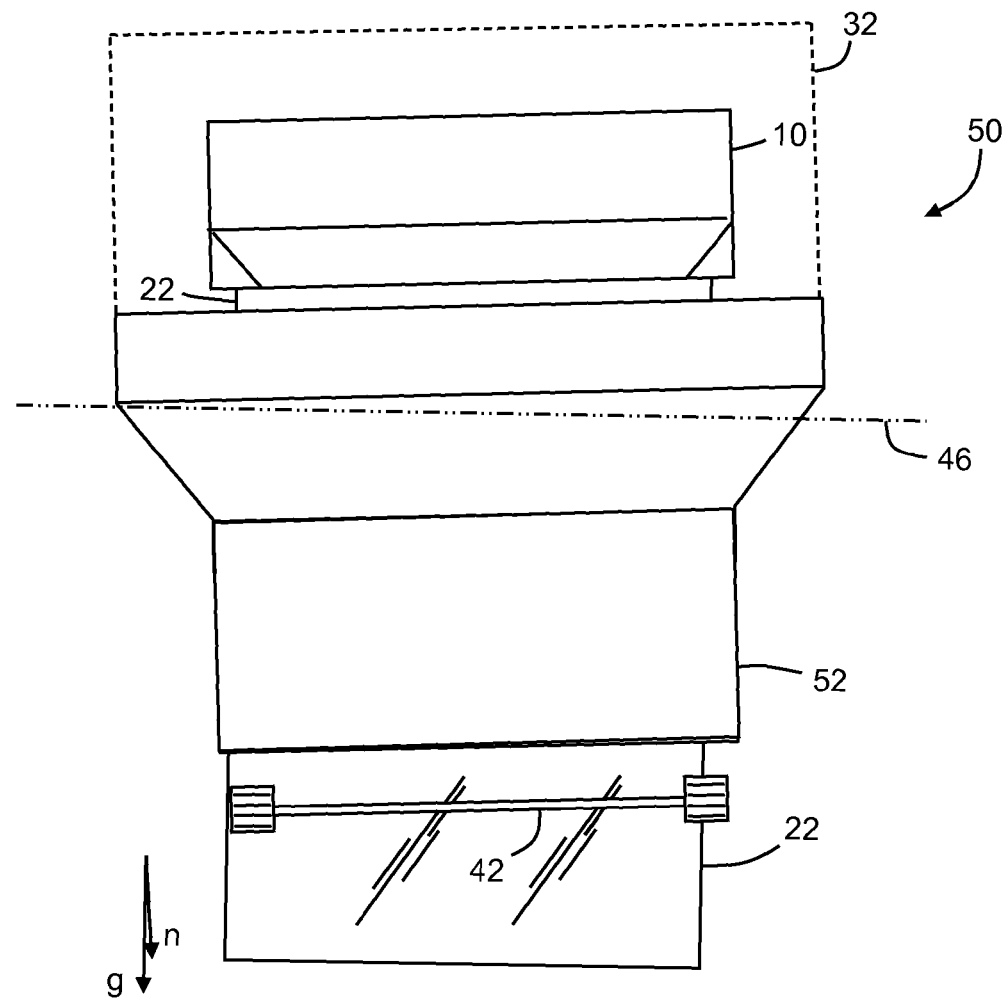
FIG. 5 is a side elevation view of a fusion downdraw apparatus comprising a single transition member, wherein tilting of the forming body results in a tilting of the entire apparatus, a possible flow disruption of the molten glass.

FIG. 5 illustrates a hypothetical fusion draw apparatus 50 comprising a single transition member 52, forming body 10, muffle 32 and pulling rollers 42, and wherein forming body 10, muffle 32, pulling rollers 42 and single transition member 52 are rigidly coupled together through a frame (not shown) so that to tilt forming body 10 the entire apparatus 50 must be tilted. In the example of FIG. 5, a tilted condition results in two nonparallel drawing forces act on the glass ribbon, a vertical gravitation force g and the pulling force n applied by pulling rollers 42. The result of the two nonparallel drawing forces can create a flow instability in the molten glass, and a horizontal shift of the ribbon. In extreme cases, the horizontal shift may cause contact with single transition member 52.

In accordance with the embodiment of FIG. 2, to facilitate tilting of the forming body and upper transition member without disturbing the flow dynamics of the ribbon, and to prevent contact with the transition housing, a two-piece transition housing for apparatus 30 comprising upper transition member 34 and lower transition member 38 is provided. Upper transition member 34 and lower transition member 38 are separated from each other by gap δ. Because of the difficulty of positioning heating and/or cooling appliances within gap δ and still accommodate tilting of upper transition member 34, gap δ is made as narrow as possible. To that end, the maximum separation between the upper and lower transition members (i.e. gap δ) is preferably less than 8 cm, but may vary depending on the degree of tilt by the upper transition member. For example, when upper transition member 34 is in a nominal position (horizontally level), gap δ is preferably equal to or less than 3 cm, typically about 2.5 cm.

Figure 6:
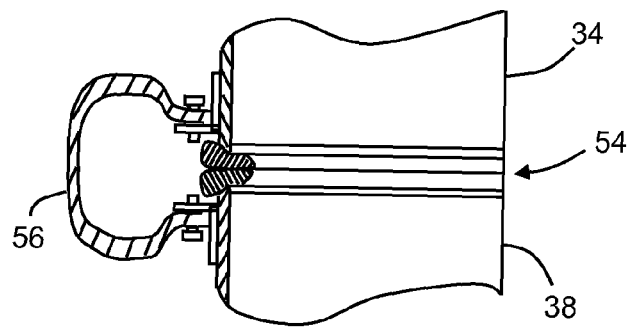
FIG. 6 is a close up cross sectional view of a portion of the upper and lower transition members showing a two layer insulating blanket. Disposed between the transition members.
Figure 7:
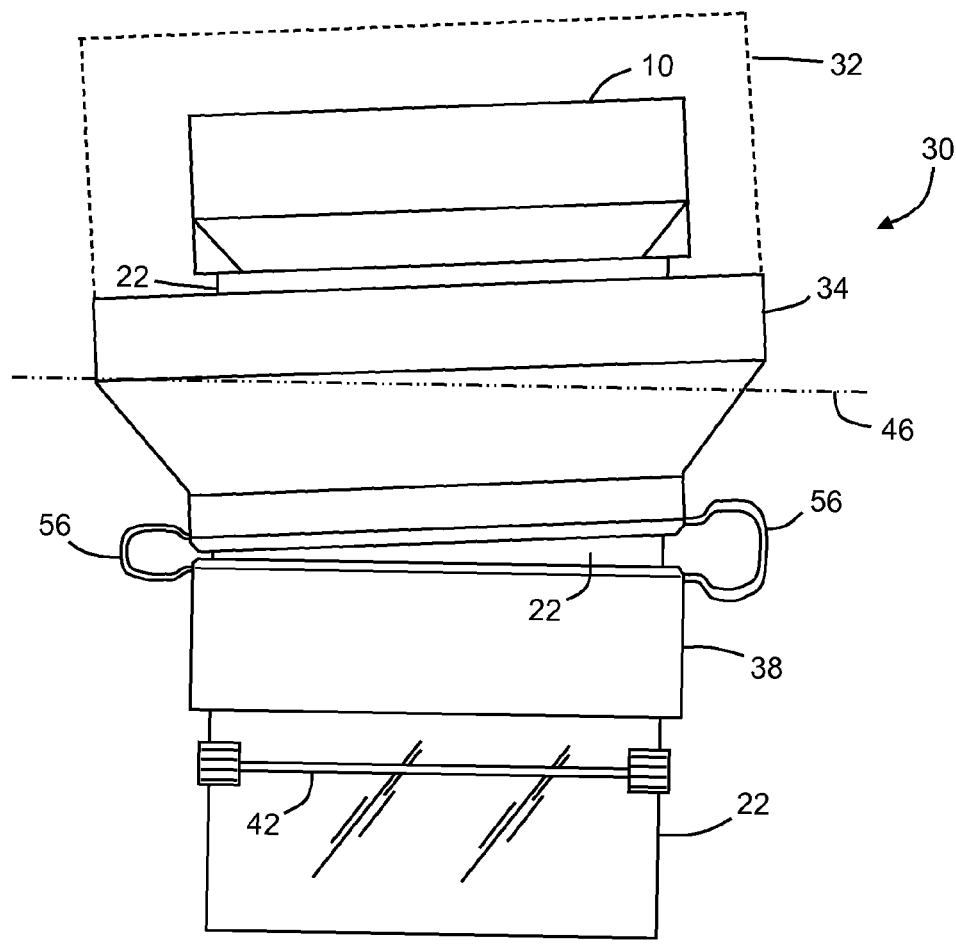
FIG. 7 is a side elevation view of the apparatus of FIG. 2 showing tilt of the muffle, forming body and upper transition member without tilting of the lower portions of the apparatus (e.g. the pulling rollers and the lower transition member).

An insulating blanket 54 (shown in a close-up cross section detail of upper and lower transition members 34, 38 in FIG. 6 as two layers) may be disposed in gap δ between upper transition member 34 and lower transition member 38 to prevent ambient air from leaking through the gap that might disrupt the thermal environment within the transition bodies. The insulating blanket forms a flexible, and preferably compressible barrier between the upper and lower transition members that can accommodate movement between the upper and lower transition bodies, while continuing to prevent airflow through the gap δ. Insulating blanket 54 may, for example, comprise one or more layers of an inorganic fiber material, such as those sold by the Unifrax Corporation under the trade name Fiberfrax® Durablanket®. However, any high temperature-resistant insulating material having sufficient flexibility and compressibility to withstand the rigors of the process described above may be used. An optional flexible sealing member 56 may be coupled to the upper transition member and the lower transition member to form an additional barrier over gap 6 that prevents air flow and heat loss through the gap. FIGS. 2 and 7 are shown without insulating blanket 54, and portions of sealing member 56 so as to not obstruct other portions of the figure. For example, in practice sealing member 56 may be extended around the entire perimeters of upper and lower transition members 34, 38 over gap 6.

In some embodiments, lower transition member 38 can move vertically, but is not configured to tilt as is the upper transition body. Preferably, pulling rollers 42 are also capable of vertical movement, and more preferably are capable of moving in unison with lower transition member 38, when coupled through supporting framework (not shown). For example, in some instances the positions of lower transition member 38 and pulling rollers 42 may be vertically adjusted to accommodate the tilt applied to upper transition member 34.

In other embodiments, the lower transition member can be tilted independently from the upper transition member (that is, both the upper and lower transition members are independently tiltable). This can be desirable if a different order of operation is performed. For example, the upper and lower transition members may be connected, such as by jack screws, so that the upper and lower transition members are first tilted in unison. Once the initial tilt is performed, the jack screws are temporarily released and the lower transition is tilted (re-leveled) so that the lower transition is again vertical (or the upper edge of the lower transition member adjacent gap δ is back in a horizontal plane). The upper and lower transition members may then be reconnected in the new configuration.

To minimize any disruption to the glass ribbon as it descends through the setting zone, the length of upper transition member 34 is configured such that gap δ is positioned where the viscosity of the glass ribbon horizontally adjacent to the gap is equal to or less than a viscosity $V_{max}$ of about $10^{7.3}$ poise. For example, the gap may be positioned such that the viscosity of the glass ribbon horizontally adjacent to the gap is equal to or less than a $V_{max}$ of about $10^7$ poise, equal to or less than a $V_{max}$ of about $10^{6.5}$ poise, or equal to or less than a $V_{max}$ of about $10^6$ poise. Preferably, gap δ may further be positioned where a viscosity of the glass ribbon horizontally adjacent to the gap is equal to or greater than a viscosity ($V_{min}$) of about $10^{5.7}$ poise. Thus, for example, the gap may be positioned horizontally adjacent a location of the ribbon where the viscosity of the ribbon is between $V_{min}$ and $V_{max}$; e.g. $10^{7.3}$ poise and $10^{5.7}$ poise, between $10^7$ poise and $10^{6.5}$ poise, between $10^{6.5}$ poise and $10^{5.7}$ poise, or between $10^6$ poise and $10^{5.7}$ poise.

It should be emphasized that the above-described embodiments, particularly any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. An apparatus for forming a sheet of glass including a forming body (10) comprising a trough (12) and converging forming surfaces (16a, 16b) that join at a root (18) such that molten glass (20) overflowing the trough forms multiple streams of molten glass that flow over the converging forming surfaces and combine at the root to form a glass ribbon (22), and wherein the forming body can be tilted relative to a horizontal plane, the apparatus further comprising:
    an upper transition member (34) that encloses the glass ribbon and is coupled to the forming body, the forming body defining a first interior space (36) through which the glass ribbon descends, and wherein the upper transition member can be tilted in unison with the forming body relative to the horizontal plane;
    a lower transition member (38) that encloses the glass ribbon and is positioned below the upper transition member, the lower transition member defining a second interior space (40) through which the glass ribbon descends; and
    wherein the upper transition member and the lower transition member are separated by a gap δ less than 8 cm and wherein the gap is positioned such that a viscosity of the glass ribbon adjacent to the gap is equal to or less than $10^{7.3}$ poise.

2. The apparatus according to claim 1, wherein the gap δ is less than 3 cm.

3. The apparatus according to claim 1, further comprising an insulating blanket disposed between the upper and lower transition members.

4. The apparatus according to claim 1, further comprising a flexible sealing member coupled to the upper and lower transition members and covering the gap δ.

5. The apparatus according to claim 1, wherein the lower transition member is vertically movable relative to the horizontal plane.

6. The apparatus according to claim 1, wherein the upper transition member and lower transition member are independently moveable.

7. The apparatus according to claim 1, wherein the viscosity of the glass ribbon adjacent to the gap δ is equal to or greater than about $10^{5.7}$ poise.

8. A method of balancing the mass flow rate of molten glass flowing over the surfaces of a forming body, the forming body comprising a trough and converging forming surfaces that join at a root such that molten glass overflowing the trough forms multiple streams of molten glass that flow over the converging forming surfaces and combine at the root to form a glass ribbon, the method comprising the steps of:
    tilting the forming body relative to a horizontal plane in response to a change in a mass flow rate of the molten glass flowing over the converging forming surfaces,
    tilting an upper transition member relative to the horizontal plane in unison with the forming body, the upper transition member positioned below and coupled to the forming body, and wherein the upper transition member encloses the glass ribbon;
    drawing the glass ribbon through a first interior space defined by the upper transition member;
    drawing the glass ribbon through a second interior space defined by a lower transition member positioned below the upper transition member, and wherein the lower transition member encloses the glass ribbon; and wherein the upper transition member and the lower transition member are separated by a gap δ less than 8 cm and wherein the gap is positioned such that a viscosity of the glass ribbon adjacent to the gap is equal to or less than about $10^{7.3}$ poise but greater than $10^{5.7}$ poise.

9. The method according to claim 8, wherein the upper and lower transition members are independently moveable.

10. The method according to claim 8, wherein the gap δ is less than 3 cm.

11. The method according to claim 8, wherein the lower transition member is translated vertically relative to the horizontal plane.

12. The method according to claim 8, wherein the lower transition member is maintained vertical while drawing the glass ribbon.

* * * * *